S. D. HARTOG.
METHOD OF MANUFACTURING PISTON RINGS.
APPLICATION FILED MAR. 8, 1919.
1,329,271. Patented Jan. 27, 1920.
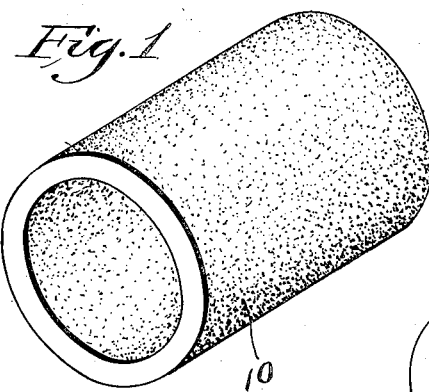
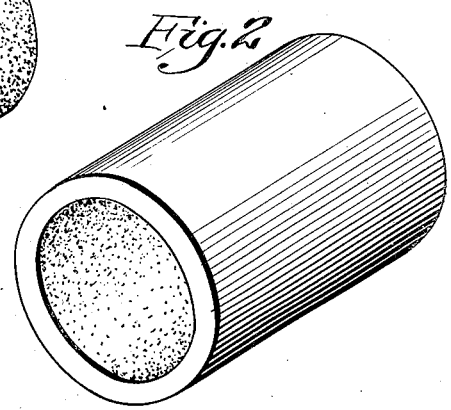
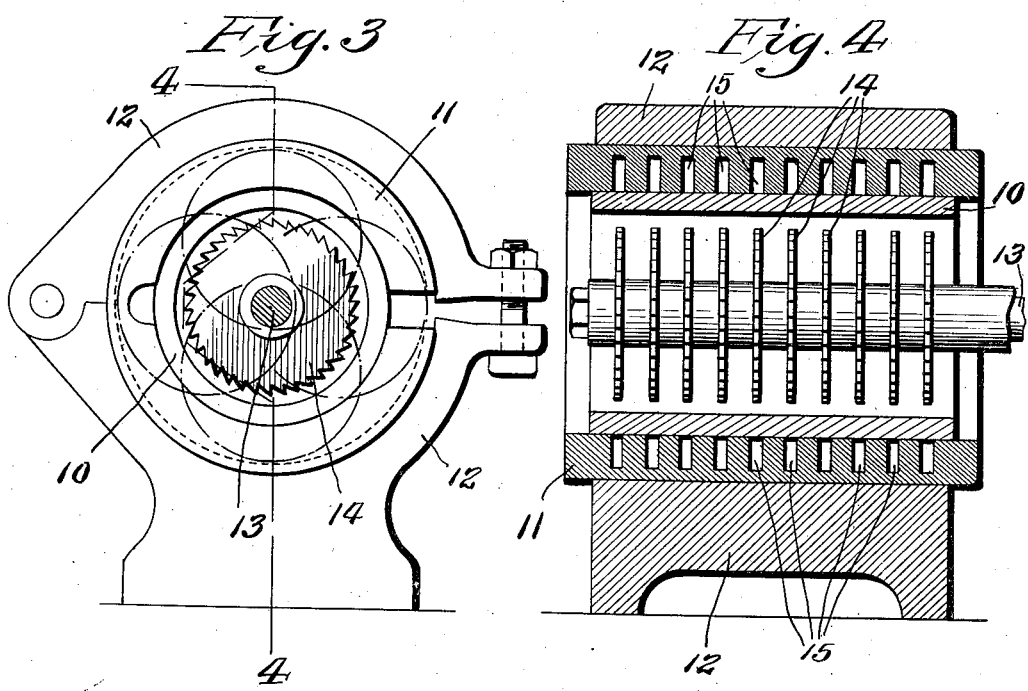
Inventor
Stephen D. Hartog

UNITED STATES PATENT OFFICE.

STEPHEN D. HARTOG, OF ST. LOUIS, MISSOURI, ASSIGNOR TO S. D. HARTOG MANUFACTURING COMPANY, OF ST. LOUIS, MISSOURI, A CORPORATION.

METHOD OF MANUFACTURING PISTON-RINGS.

1,329,271.  Specification of Letters Patent.  Patented Jan. 27, 1920.

Application filed March 8, 1919. Serial No. 281,448.

*To all whom it may concern:*

Be it known that I, STEPHEN D. HARTOG, a citizen of the United States, residing at St. Louis, Missouri, have invented a certain new and useful Improvement in Methods of Manufacturing Piston-Rings, of which the following is a full, clear, and exact description, such as will enable others skilled in the art to which it appertains to make and use the same, reference being had to the accompanying drawings, forming part of this specification.

My invention relates to a new and useful method of manufacturing piston packing rings and the like, the principal objects of my invention being to materially decrease the amount of time and labor ordinarily involved in manufacture of piston packing rings, and consequently decreasing the cost of production; to produce from a tubular metal body a plurality of piston rings, each of which, when finished, has all the desirable qualities of an individually cast ring, including elasticity and resiliency, ability to perform its normal functions throughout a wide range of temperature, and all of the rings having the same wearing qualities and the same relatively high degree of resistance to breakage.

Further objects of my invention are, to provide an improved method whereby the waste of raw material or the material entering into the construction of the blank or body from which the rings are formed, is reduced to a minimum; further, to greatly simplify the manufacture and production of piston packing rings to produce rings which require no finishing operations other than the splitting of the rings, and further, to produce by a relatively small number of operations, rings which are uniform in size, thereby enabling them to be readily fitted into the grooves of a piston or the like and which grooves, it will be understood, have standard dimensions.

My invention consists in practising or carrying out the following essential steps:—

First. The formation by casting of a hollow cylinder of metal, preferably iron, the wall of said cylinder being of uniform thickness throughout its entire structure and devoid of all projections, flanges, and the like;

Second. The finishing, by machining or otherwise, of the external periphery or outer surface of said cast metal cylinder, the depth of machining or finishing being such as to remove only the "skin" of the casting;

Third. The placing of the machined cylinder in a gripping or clamping structure which will rigidly hold it against movement circumferentially and lengthwise;

Fourth. The locating of a multiple cutter within the metal cylinder, rotating said cutter at a proper speed and shifting the multiple cutter radially toward the cylinder or vice versa, or moving said cutter and cylinder radially toward each other so that the cutting members of the multiple cutter will cut through the wall of the cylinder, thereby dividing the same into a plurality of rings of uniform width, the direction of cut through the cylinder wall being outwardly from the interior of the cylinder.

In the drawings—which form a part of this specification—

Figure 1 is a perspective view of a hollow cylindrical body of cast metal from which the packing rings are formed.

Fig. 2 is a perspective view of the cylinder as the same appears after its external surface has been machined or finished.

Fig. 3 is an elevational view of the cast metal cylinder positioned in a holder and also showing the cutter arranged within the cylinder.

Fig. 4 is a vertical section taken approximately on the line 4—4 of Fig. 3.

The first step in the manufacture of piston rings under my improved method, consists in the formation, preferably by casting, of a tubular body or hollow cylinder 10, the same being devoid of all lugs, projections, flanges, and the like. The thickness of the wall of this cast metal cylinder is uniform throughout its entire body, and said thickness is but a minute degree greater than the requisite thickness of the finished rings. It will be understood that where a cylindrical body is formed by casting and the wall of said body is of uniform thickness, the metal throughout the entire body has the same molecular density and the same inherent physical properties with the exception, of course, of an extremely thin stratum of metal at the external surfaces of the body and which stratum is generally termed the "skin" or scale of the casting.

The second step in my improved method consists in dressing or finishing by machining or otherwise, the external or outer peripheral surface of the wall of the cast metal body, to such an extent as to remove only the "skin" or scale surface thereof, and at this stage of the operations, the work has the appearance of the cylinder illustrated in Fig. 2.

The next step in my improved method consists in placing the cylinder having the finished surface in a suitable holder, preferably a hollow cylindrical member 11, the internal face of which is adapted to directly engage the finished surface of the cylinder 10, said holder 11 being preferably arranged between gripping members or jaws 12. These jaws are preferably hinged to each other at one end and their opposite ends are provided with suitable means for drawing them toward each other to contract the holder 11, and consequently rigidly grip the inclosed cylinder 10.

The next step in my improved method consists in positioning a multiple cutter within the interior of the cylinder 10, said multiple cutter being preferably of the rotary type and comprising a shaft 13 which carries a series of hardened metal cutting disks 14. The peripheral edges of these disks are toothed or notched and said disks are spaced at equal distances apart. The spaces between these cutters are equal to the width of the finished packing rings. This multiple cutter is now rotated at proper speed and said cutter is moved radially with respect to the axis of the cylinder 10, and as a result, the disks 14 cut through the wall of the cylinder, thereby forming a series of slots having a length slightly greater than ninety degrees on the circumference of said cylinder.

The rotary cutter may now be moved either in the opposite direction or in a direction at right angles to the direction of movement to effect the first cut, and the cutting members 14 will cut through the wall of the cylinder 10 to form a series of slots or openings therethrough which are in direct alinement with the first slots and said second slots having a length slightly greater than ninety degrees or one-fourth the circumference of the cylinder.

The rotary cutter may now be moved either in the opposite direction or in a direction at right angles to the direction of movement of the second cutting operation, thereby cutting a third series of slots through the wall of the cylinder, after which the cutter is moved radially so as to cut a fourth series of slots, this final cutting action separating said cylinder into a series of rings of uniform width and thickness and which rings when properly split are ready to be applied to a piston or the like.

In order to accommodate the outer portions of the cutters or those portions which move outwardly past the outer face of the wall of the cylinder during the cutting operations, the holder 11 is provided with a series of internally arranged circumferentially disposed slots 15. The positions of the rotary cutters when moved outwardly to cut through the wall of the cylinder are indicated by the dot and dash circles in Fig. 3.

By my improved method of cutting which contemplates the arrangement of the cutting members within the cylinder and the movement of said cutters radially with respect to said cylinder or vice versa, I am able to obtain great accuracy in the dimensions of the finished rings, and in addition, the cutter can be operated with comparatively little power, for the radial action of the cutter and the merging of one series of cuts or slots with another, materially reduces the amount of surfaces in action, that is, the surfaces between the active cutting edges of the disks 14 and the surfaces of the cylinder with which said cutting edges are in contact.

After the rings have been thus separated, they are removed from the holder 11 and said rings are split so that they will readily expand and contract as is required in service.

Each ring is provided with finished or machined sides and outer face or periphery while the inner face of periphery retains the original "skin" of the cast cylinder.

Inasmuch as the rings are formed from a cylinder having a wall which is uniform in thickness and devoid of all projecting lugs and flanges, said rings have the same molecular density and the same inherent degree of resiliency and elasticity, and which advantages cannot be obtained where the rings are formed from a cast metal cylinder, the wall of which varies in thickness or is provided with lugs or flanges.

By my improved method, the entire cylinder is divided into a series of rings with the result that the only waste in the production of said rings is the shavings or cuttings removed by the rotary cutters 14 and as these cutters are comparatively thin, the amount of material removed by said cutters is relatively small.

I do not desire to limit myself to the particular form of apparatus herein shown and described, for it is obvious that other forms of apparatus can be advantageously employed for assisting in the carrying out of my improved method, and further, that it may be found desirable in some instances to effect the cutting operations by moving the cylinder radially toward the rotary cutter or by moving said cutter and the cylinder radially toward each other.

I claim:

1. The hereindescribed method of making piston packing rings which consists in forming a tubular metal body by casting, finishing the external peripheral surface of said body to bring the wall thereof to the requisite thickness, then cutting through the wall of said body to divide the same into a plurality of rings of uniform width, the direction of cut being outwardly from the interior of the body.

2. The hereindescribed method of making piston packing rings which consists in forming a tubular metal body by casting, gripping the external surface of said tubular metal body to retain it in a rigid position, and then cutting through the wall of said body to divide it into a plurality of rings, the direction of cut being outwardly from the interior of the body.

3. The hereindescribed method of making piston packing rings which consists in forming a tubular metal body by casting finishing the external peripheral surface of said body, gripping the said external surface to rigidly hold the tubular metal body in a fixed position, and then cutting through the wall of said body to divide it into a plurality of rings, the direction of cut being outwardly from the interior of the body.

In testimony whereof I hereunto affix my signature this 4th day of March, 1919.

STEPHEN D. HARTOG.